United States Patent
Palmer

(10) Patent No.: US 9,958,113 B2
(45) Date of Patent: May 1, 2018

(54) FAN BLADE LUBRICATION

(71) Applicant: UNITED TECHNOLOGIES CORPORATION, Farmington, CT (US)

(72) Inventor: Daniel F. Palmer, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 226 days.

(21) Appl. No.: 14/761,702

(22) PCT Filed: Dec. 18, 2013

(86) PCT No.: PCT/US2013/076011
§ 371 (c)(1),
(2) Date: Jul. 17, 2015

(87) PCT Pub. No.: WO2014/143286
PCT Pub. Date: Sep. 18, 2014

(65) Prior Publication Data
US 2016/0010795 A1 Jan. 14, 2016

Related U.S. Application Data

(60) Provisional application No. 61/799,534, filed on Mar. 15, 2013.

(51) Int. Cl.
*F16N 3/02* (2006.01)
*F01D 5/00* (2006.01)
(Continued)

(52) U.S. Cl.
CPC .............. *F16N 3/02* (2013.01); *B05B 7/2402* (2013.01); *F01D 5/005* (2013.01); *F01D 5/3092* (2013.01);
(Continued)

(58) Field of Classification Search
CPC . F16N 3/02; F16N 3/00; B05B 7/2402; F01D 5/005; F01D 5/3092; F01D 25/18;
(Continued)

(56) References Cited

U.S. PATENT DOCUMENTS 1,040,476 A    10/1912    Wehrenberg
1,630,846 A *   5/1927    Holst .................. F16N 3/08
                                                  222/323
(Continued)

FOREIGN PATENT DOCUMENTS

EP     2022944 A1    2/2009
EP     2022944 A1    2/2009
GB     306343 A      2/1929

OTHER PUBLICATIONS

European Search Report for Application No. EP 13878103.
(Continued)

*Primary Examiner* — Michael A Riegelman
(74) *Attorney, Agent, or Firm* — Cantor Colburn LLP

(57) ABSTRACT

In accordance with one aspect of the disclosure, a lubricant application device for providing lubricant to an airfoil of a gas turbine engine is disclosed. The device may include a container for holding a lubricant, a fluid outlet in fluid communication with the container, a discharge mechanism controlling a flow of the lubricant from the container to the fluid outlet, and an extension tube in fluid communication with the fluid outlet. When the discharge mechanism is activated the lubricant may flow out of the container and through the extension tube. The extension tube may be dimensioned to fit between an airfoil root and rotor cavity of a gas turbine engine.

9 Claims, 4 Drawing Sheets

(51) Int. Cl.
  *F01D 5/30* (2006.01)
  *B05B 7/24* (2006.01)
  *F01D 25/18* (2006.01)
  *F16N 3/00* (2006.01)

(52) U.S. Cl.
  CPC .......... *F01D 25/18* (2013.01); *F05D 2220/32* (2013.01); *F05D 2220/36* (2013.01); *F05D 2240/30* (2013.01); *F05D 2260/98* (2013.01); *F16N 3/00* (2013.01)

(58) Field of Classification Search
  CPC ............. F05D 2220/32; F05D 2220/36; F05D 2240/30; F05D 2260/98
  See application file for complete search history.

(56) References Cited

U.S. PATENT DOCUMENTS

| | | | | |
|---|---|---|---|---|
| 2,686,656 A * | 8/1954 | Abild | ...... | F01D 5/323 416/221 |
| 2,982,443 A * | 5/1961 | Ellis | ...... | B05B 11/06 222/1 |
| 3,045,968 A * | 7/1962 | Willis | ...... | F01D 5/3007 416/216 |
| 3,317,988 A * | 5/1967 | Wilhelm | ...... | B23P 15/006 29/447 |
| 3,784,320 A * | 1/1974 | Rossmann | ...... | F01D 5/284 416/215 |
| 3,910,719 A * | 10/1975 | Hessler | ...... | F01D 5/3092 416/134 R |
| 4,169,694 A * | 10/1979 | Sanday | ...... | F01D 5/3007 416/219 R |
| 4,790,723 A * | 12/1988 | Wilson | ...... | C04B 37/008 416/213 R |
| 4,820,126 A * | 4/1989 | Gavilan | ...... | F01D 5/3092 416/221 |
| 5,087,174 A * | 2/1992 | Shannon | ...... | F01D 5/28 29/889.21 |
| 5,100,292 A * | 3/1992 | Matula | ...... | F01D 5/30 416/220 R |
| 5,110,262 A * | 5/1992 | Evans | ...... | F01D 5/3007 416/219 R |
| 5,137,420 A * | 8/1992 | Sigworth | ...... | F01D 5/3007 415/170.1 |
| 5,139,389 A * | 8/1992 | Eng | ...... | F01D 5/3007 416/219 R |
| 5,160,243 A * | 11/1992 | Herzner | ...... | F01D 5/28 416/220 R |
| 5,368,444 A * | 11/1994 | Anderson | ...... | F01D 5/3092 416/220 R |
| 5,474,214 A * | 12/1995 | Chung | ...... | F16N 5/02 222/262 |
| 5,791,877 A * | 8/1998 | Stenneler | ...... | F01D 5/22 416/204 A |
| 6,102,664 A * | 8/2000 | Nguyen | ...... | F01D 5/26 416/248 |
| 6,132,175 A * | 10/2000 | Cai | ...... | F01D 5/284 403/29 |
| 6,494,347 B1 * | 12/2002 | Yeh | ...... | F16N 3/12 184/105.2 |
| 6,773,234 B2 * | 8/2004 | Sinha | ...... | F01D 5/3007 29/889.21 |
| 6,786,696 B2 * | 9/2004 | Herman | ...... | F01D 5/147 416/193 A |
| 8,672,634 B2 * | 3/2014 | Parkos | ...... | F01D 5/3092 416/219 R |
| 2002/0044870 A1* | 4/2002 | Simonetti | ...... | F01D 5/28 416/221 |
| 2005/0180852 A1* | 8/2005 | Goldfinch | ...... | F01D 5/3092 416/219 R |
| 2006/0151540 A1* | 7/2006 | Ling | ...... | F16N 3/12 222/262 |
| 2006/0219483 A1* | 10/2006 | Gillott | ...... | B05C 17/00 184/109 |
| 2006/0292398 A1* | 12/2006 | Vigneau | ...... | C10M 103/00 428/698 |
| 2011/0000183 A1* | 1/2011 | Dimelow | ...... | F01D 5/3092 60/39.091 |
| 2012/0263595 A1* | 10/2012 | Evans | ...... | F01D 5/3092 416/189 |
| 2013/0302170 A1* | 11/2013 | Booze | ...... | F01D 5/3092 416/219 R |
| 2013/0302173 A1* | 11/2013 | Booze | ...... | F01D 5/282 416/230 |
| 2014/0234117 A1* | 8/2014 | Cairo | ...... | C04B 35/117 416/241 R |
| 2016/0003067 A1* | 1/2016 | Riewe | ...... | F01D 5/3092 416/219 R |

OTHER PUBLICATIONS

English Abstract for EP2022944.
International Search Report for related International Application No. PCT/US13/76011; dated Apr. 14, 2014.

\* cited by examiner

FAN BLADE LUBRICATION

CROSS-REFERENCE TO RELATED APPLICATION

This application is a US National Stage under 35 USC § 371 of International Patent Application No. PCT/US13/76011 filed on Dec. 18, 2013, and claims priority under 35 USC § 119(e) to U.S. Provisional Patent Application Ser. No. 61/799,534 filed on Mar. 15, 2013.

FIELD OF THE DISCLOSURE

The present disclosure generally relates to gas turbine engines, and more specifically to lubrication of fan blade roots for a gas turbine engine.

BACKGROUND OF THE DISCLOSURE

Gas turbine engines generally have a plurality of axially aligned components including a fan, a compressor section, a combustor, and a turbine section. The fan, positioned at a forward end of the engine, rotates to draw in and pressurize ambient air. The pressurized air flows to the compressor section, as a core flow, where the air is compressed further and then flows to the combustor. At the combustor, the compressed air is mixed with fuel and combusted to form an exhaust. The exhaust expands from the combustor through the turbine section, causing rotors of the turbine section to rotate, and then flows out of the engine at an aft end of the engine. The rotation of the turbine rotors drive the rotation of the fan and rotors of the compressor section by way of a shaft, or a plurality of concentrically mounted shafts in the case of a multi-spool engine.

The fan typically includes a rotor disk and a plurality of blades extending radially outward from the rotor disk. Each of the blades typically has a root that is positioned within a root cavity of the rotor disk that prevents the blades from disengaging from the rotor disk during operation of the fan. However, centrifugal forces on the blades cause the root to chafe against the rotor disk. This chafing is typically mitigated by applying a lubricant to the affected surfaces. To accomplish this using prior art methods, each blade must be disengaged from the rotor disk, the lubricant can then be applied, and then the blades can be re-assembled with the rotor disk. Once the blades are reengaged with the rotor disk the fan must be tested which entails running the engine up to operational speeds to determine if the blades were reinstalled correctly. This may require the engine and associated aircraft to be moved due to space or noise constraints. If the blades were incorrectly installed then the fan may need to be disassembled and then reassembled in the correct manner. This process is time consuming and exposes the blades and rotor disk to potential damage due to incorrect reassembly or mis-handling of the engine components. Therefore, a new method for lubricating the root and root cavity of the fan without disassembling the fan is needed.

SUMMARY OF THE DISCLOSURE

In accordance with one aspect of the disclosure, a lubricant application device for providing lubricant to an airfoil of a gas turbine engine is disclosed. The device may include a container for holding a lubricant, a fluid outlet in fluid communication with the container, a discharge mechanism controlling a flow of the lubricant from the container to the fluid outlet, and an extension tube in fluid communication with the fluid outlet. When the discharge mechanism is activated the lubricant may flow out of the container and through the extension tube. The extension tube may be dimensioned to fit between an airfoil root and rotor cavity of a gas turbine engine.

In a refinement, the lubricant application device may be a hand-held spray gun.

In another refinement, a distal tip of the extension tube may be formed to an angle less than one-hundred eighty degrees.

In a further refinement, the distal tip of the extension tube may be formed to an angle of about forty-five degrees.

In yet another refinement, the extension tube may be constructed from a plastic material.

In accordance with another aspect of the present disclosure, a method of applying a lubricant to a rotor of a gas turbine engine is disclosed. The method may include a step of providing a lubricant application device having a container for holding the lubricant, a fluid outlet in fluid communication with the container, a discharge mechanism controlling a flow of lubricant from the container to the fluid outlet, and an extension tube in fluid communication with the fluid outlet. The method may further include positioning the extension tube proximate the rotor and activating the discharge mechanism to release the lubricant from the container and onto the rotor.

In a refinement, the method may further include deactivating the discharge mechanism, removing the extension tube from proximate the rotor, and returning the rotor to active use.

In a further refinement, the method may further include repeating the steps of positioning the extension tube, activating the discharge mechanism, deactivating the discharge mechanism, and removing the extension tube a plurality of times before returning the rotor to active use.

In another refinement, the positioning of the extension tube may include inserting the extension tube into a cavity formed in a rotor disk to accept a blade of the rotor.

In a further refinement, inserting the extension tube into the cavity may include bending the extension tube around the shape of at least one of the blade and rotor disk.

In another further refinement, the method may further include releasing lubricant onto a pressure surface of a root of the blade.

In yet another refinement, activating the discharge mechanism may include depressing a trigger.

In a further refinement, deactivating the discharge mechanism may include releasing a trigger.

In accordance with yet another aspect of the present disclosure, a method of applying a lubricant to a fully assembled rotor of a gas turbine engine is disclosed. The method may include providing a lubricant application device having a container for holding the lubricant, a fluid outlet in fluid communication with the container, a discharge mechanism controlling the flow of lubricant from the container to the fluid outlet, and an extension tube in fluid communication with the fluid outlet. The method may further include inserting the extension tube into a root cavity formed in a rotor disk of the rotor to accept a root of a blade of the rotor and activating the discharge mechanism to release the lubricant from the container and onto the rotor.

In a refinement, the method may further include deactivating the discharge mechanism, removing the extension tube from the root cavity, and returning the rotor to active use.

In a further refinement, the method may further include repeating the steps of inserting the extension tube, activating the discharge mechanism, deactivating the discharge mechanism, and removing the extension tube a plurality of times before returning the rotor to active use.

In another refinement, the method may further include releasing the lubricant onto a pressure surface of the root.

In a further refinement, the method may further include providing the extension tube with a length greater than an axial length of the pressure surface of the root.

In yet another refinement, the method may further include providing the rotor as a fan of the gas turbine engine and not removing the fan from the gas turbine engine to apply the lubricant.

In still another refinement, the step of inserting the extension tube into the root cavity may involve bending the extension tube to reach a pressure surface of the root.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
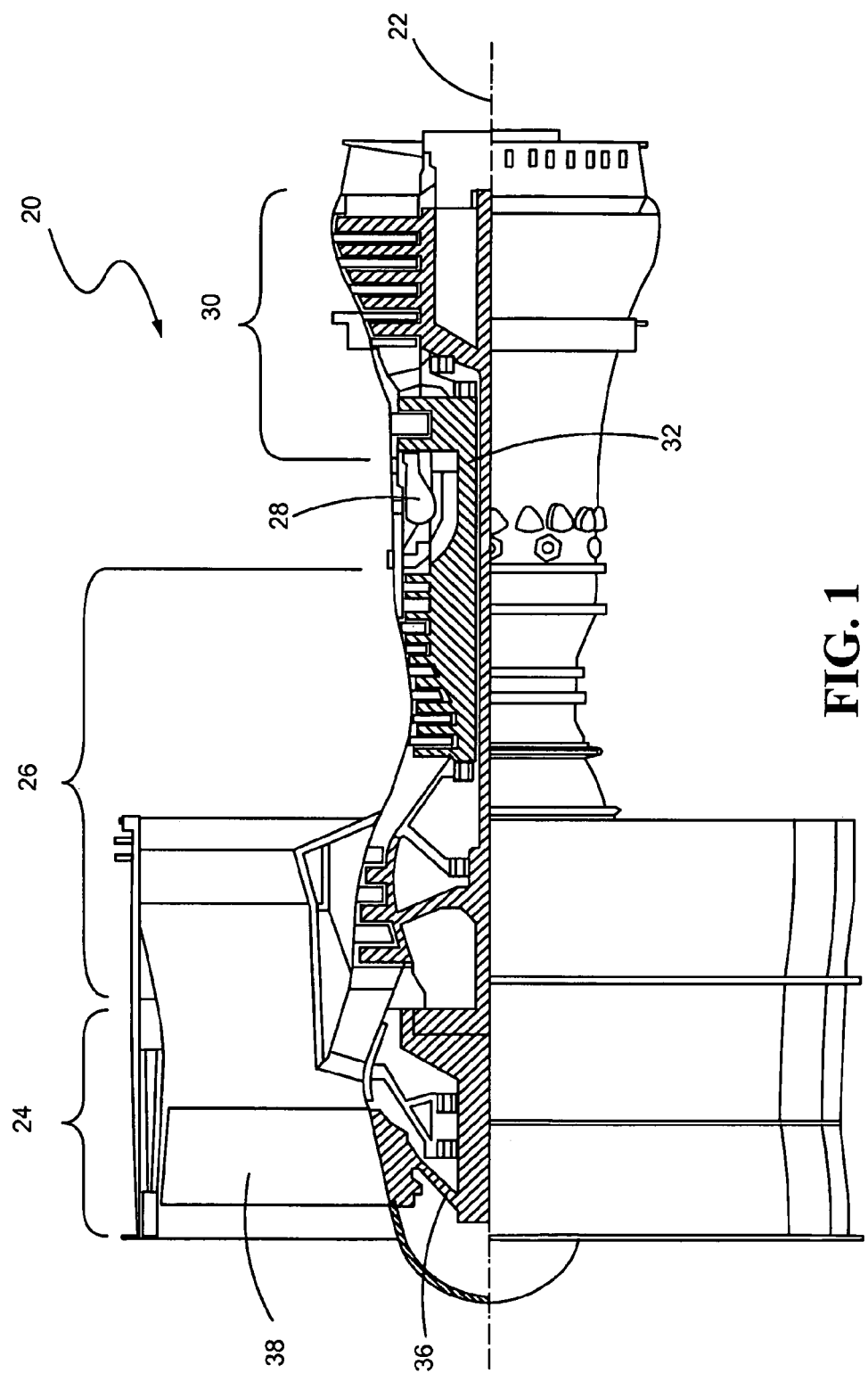
FIG. 1 is a partial cross-sectional view of a gas turbine engine.

Referring now to the drawings, and with specific reference to FIG. 1, a gas turbine engine is illustrated and generally indicated by reference numeral 20. As can be seen, the engine 20 may include a plurality of components axially aligned along a engine axis 22. At a forward end of the engine 20 a fan 24 rotates to draw in and pressurize ambient air. This air flows downstream through the engine 20 to a compressor section 26 where it is compressed. From the compressor section 26, the compressed air flows further downstream to a combustor 28 where the air is mixed with a fuel and combusted to generate heat and form an exhaust. The exhaust expands even further downstream through a turbine section 30 and exits the engine 20 at an aft end. As the exhaust expands, rotors of the turbine section 30 are rotated. This rotational motion is communicated to the fan 24 and rotors of the compressor section 26 via an engine shaft 32, or plurality of engine shafts 32 in the case of a dual-spool engine 20 as shown.

Figure 2:
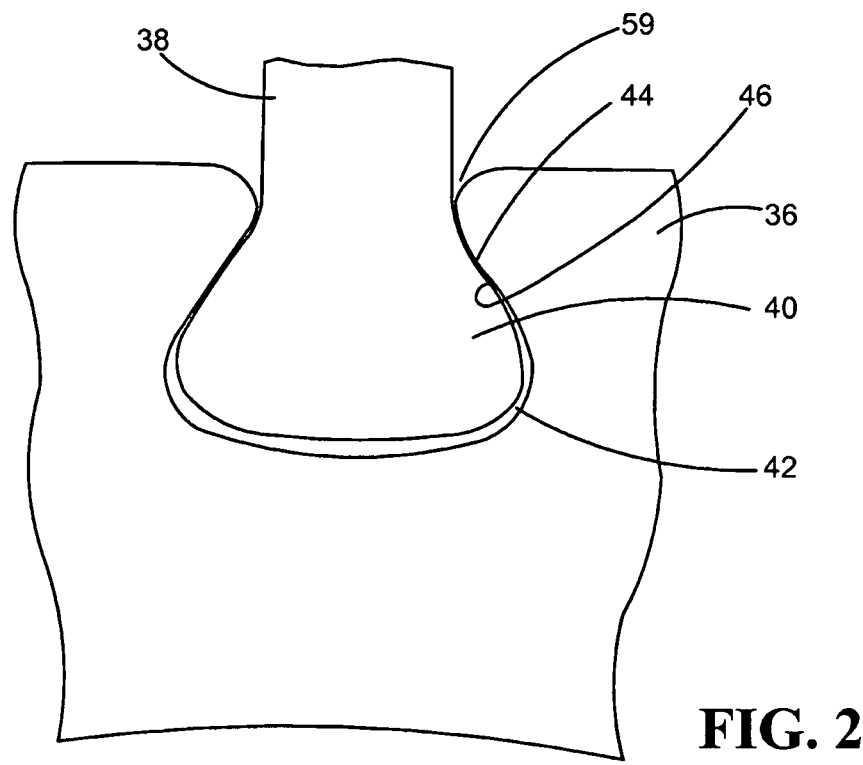
FIG. 2 is a cross-sectional view of a root of a blade engaged with a rotor disk.
Figure 3:
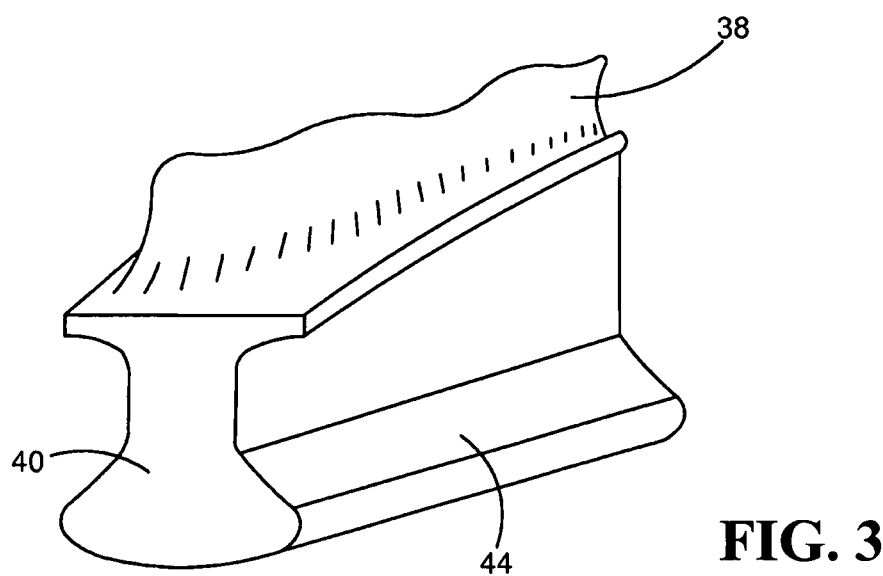
FIG. 3 is a perspective view of a root of a blade.
Figure 4:
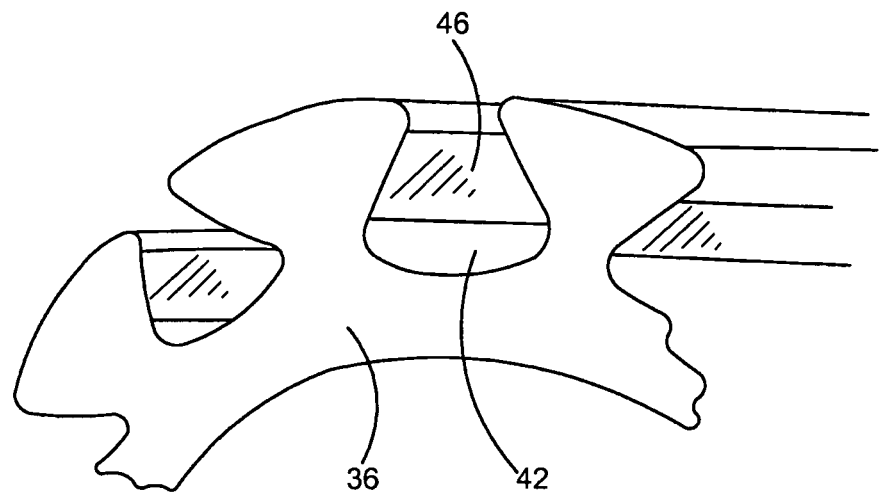
FIG. 4 is a perspective view of a fragment of a rotor disk detailing a plurality of root cavities.

The fan 24 may include a rotor disk 36 and a plurality of blades 38 extending radially outward from the rotor disk 36. As can be seen in FIG. 2, each of the blades 38 may include a root 40 and the rotor disk 36 may include a plurality of root cavities 42. Each cavity 42 may be configured to receive and retain the root 40 of one of the blades 38. During operation of the engine 20, this configuration prevents the blades 38 from disengaging from the rotor disk 36. However, the rotational motion of the rotor disk 36 creates centrifugal forces on the blades 38 that pull the blades 38 radially outward away from the engine axis 22, causing a pressure surface 44 of the root 40, best seen in FIG. 3, to chafe against a retention surface 46 of the rotor disk 36, best seen in FIG. 4. The contact between the surfaces 44, 46 prevent the blade 38 from disengaging from the rotor disk 36. When the engine transitions between high and low power operations, the blade 38 may transition between a tight position and a loose position. The blade may get caught in the tight position, which can cause undesirable vibrations in the fan 24. Therefore, a lubricant 48 is needed to reduce the chafing between these surfaces 44, 46 and allow the blades 38 to move easier between the tight and loose positions. The prior art requires the fan 24 to be dismantled before the lubricant 48 may be applied to act on the root 40 and root cavity 42. However, this method is undesirable and a new device and method is detailed below. It is in this regard that the present disclosure greatly improves upon the prior art.

Figure 5:
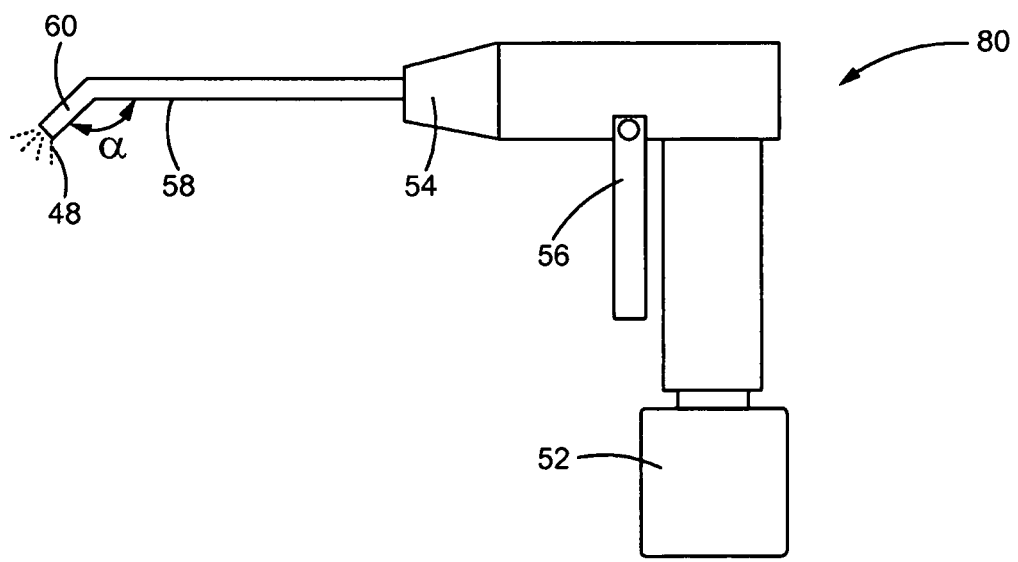
FIG. 5 is a schematic view of a lubrication application device constructed in accordance with an embodiment of the present disclosure.
Figure 6:
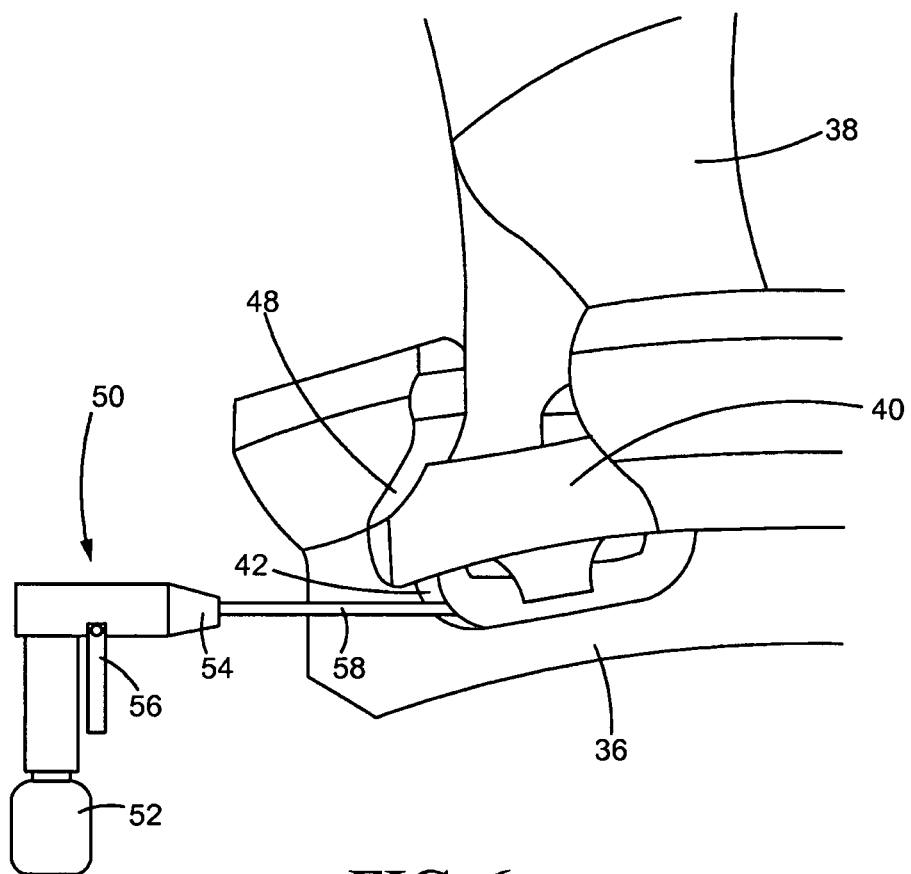
FIG. 6 is a perspective view of a lubrication application method performed in accordance with an embodiment of the present disclosure.

More specifically, in order to provide the lubricant 48 to the root 40 and root cavity 42 without dismantling the fan 24 a lubricant application device 50 is used. This device 50 may include a container 52 to hold the lubricant 48, a fluid outlet 54 in fluid communication with the container 52, a discharge mechanism 56 that controls a flow of the lubricant 48 from the container 52 to the fluid outlet 54, and an extension tube 58 in fluid communication with the fluid outlet 54. One example of a lubricant application device 50 may be a hand-held spray gun such as the one illustrated in FIG. 5. However, the spray gun illustrated herein should not be considered limiting in any way as it is provided for description purposes only.

When the fan 24 is not in operation, the surfaces 44 and 46 are not forced together as strongly as during operation of the engine 20 and allows the lubricant 48 to move between the surfaces 44, 46. To provide this lubricant 48, the extension tube 58 may be inserted into the root cavity 42. When discharged into the cavity 42, the lubricant 48 may be acted upon by gravity causing the lubricant 48 to flow to the surfaces 46, 48. In an alternative method, the lubricant 48 may be released into an outer cavity 59 formed between the blade 38 and the rotor disk 36. The extension tube 58 may be used to discharge the lubricant 48 along an axial length of outer cavity 59 and gravity may act on this lubricant 48 to cause it to flow to the surfaces 46, 48. To better assist in the application of the lubricant 48, the extension tube 58 may have a length greater than a length of the surfaces 44, 46 in order to provide coverage of an entire axial length of the surfaces 44, 46 when inserting the extension tube 58 from only one side of the fan 24. In one embodiment, the length of the extension tube 58 is about sixteen inches where the lengths of the surfaces are about twelve inches. However, other lengths are possible, and this is only one exemplary embodiment.

The extension tube 58 may further include a distal tip 60 that discharges the lubricant 48. This tip 60 may be bent at an angle α to better direct the lubricant 48 onto the surfaces 44, 46 when the extension tube 58 is inserted into the root cavity 42. In one embodiment, the angle α is about forty-five degrees. However, the presented angle is only one exemplary embodiment and other angles are also possible. The extension tube 58 may be flexible to allow the extension tube 58 to bend around contours of the root 40 and root cavity 42.

The extension tube 58 may be constructed of a plastic to provide a sturdy, flexible structure that retains its straight shape, but may be bent around an object, such as the rotor disk 36 to reach a desired location such as the surfaces 44, 46. A rubber tube may allow the tube to bend as needed, however the rubber tube may not be able to retain the sturdy shape needed to insert the tube into the root cavity 42. A metal tube may allow the tube to have the desired sturdy shape, but metal typically does not bend well and once bent typically does not return to its original shape and, therefore, may not be reusable. Also, the plastic extension tube 58 may reduce any potential damage to the fan 24, due to contact between the extension tube 58 and the fan 24, as opposed to a metal tube. However, any desired material may be used to construct the extension tube 58 and plastic is only one example thereof.

INDUSTRIAL APPLICABILITY

From the foregoing, it can be seen that the technology disclosed herein has industrial applicability in a variety of settings such as, but not limited to providing a lubricant to chafing surfaces between a fan blade root and fan rotor disk. The lubricant application device may accomplish this task by including an extension tube that can be inserted between into the root cavity of a rotor disk while a blade is still engaged with the rotor disk. This may allow the fan to be lubricated without the need to disassemble the fan, which may reduce the time necessary for lubrication, reduce potential damage to the fan and engine due to dropped materials or engine components, and prevent mis-assembly of the fan once the lubrication has been completed.

While the present disclosure has been made in reference to a gas turbine engine and an aircraft, and specifically to a fan for a gas turbine engine, one skilled in the art will understand that the teachings herein can be used in other applications as well such as, but not limited to, providing a lubricant to other airfoils of a gas turbine engine or other hard-to-reach surfaces that require lubrication. It is therefore intended that the scope of the invention not be limited by the embodiments presented herein as the best mode for carrying out the invention, but that the invention include all equivalents falling within the spirit and scope of the appended claims as well.

What is claimed is:

1. A method of applying a lubricant to a fully assembled rotor of a gas turbine engine, comprising:
    providing a lubricant application device having a container for holding the lubricant, a fluid outlet in fluid communication with the container, a discharge mechanism controlling the flow of lubricant from the container to the fluid outlet, and an extension tube in fluid communication with the fluid outlet;
    inserting the extension tube into a root cavity formed in a rotor disk of the rotor to accept a root of a blade of the rotor; and
    activating the discharge mechanism to release the lubricant from the container and onto the rotor.

2. The method of claim 1, wherein activating the discharge mechanism includes depressing a trigger.

3. The method of claim 2, further comprising deactivating the discharge mechanism, wherein deactivating the discharge mechanism includes releasing the trigger.

4. The method of claim 1, further comprising:
    deactivating the discharge mechanism;
    removing the extension tube from the root cavity: and
    returning the rotor to active use.

5. The method of claim 4, further comprising repeating the steps of inserting the extension tube, activating the discharge mechanism, deactivating the discharge mechanism, and removing the extension tube a plurality of times before returning the rotor to active use.

6. The method of claim 1, further comprising releasing the lubricant onto a pressure surface of the root.

7. The method of claim 6, further including providing the extension tube with a length greater than an axial length of the pressure surface of the root.

8. The method of claim 1, further including providing the rotor as a fan of the gas turbine engine and not removing the fan from the gas turbine engine to apply the lubricant.

9. The method of claim 1, wherein the step of inserting the extension tube into the root cavity involves bending the extension tube to reach a pressure surface of the root.

* * * * *